(No Model.)
A. G. LANO.
POTATO DIGGER.
No. 595,396. Patented Dec. 14, 1897.
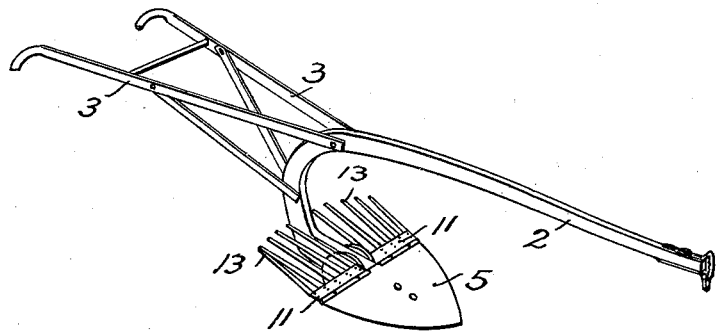
Fig. 1.
Fig. 4.
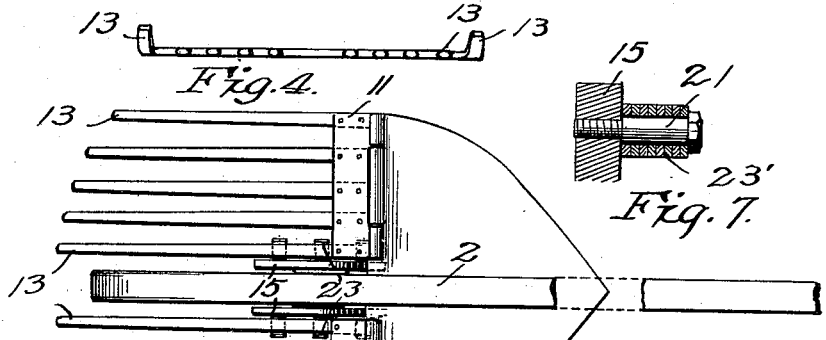
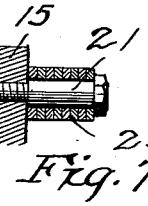
Fig. 7.
Fig. 2.
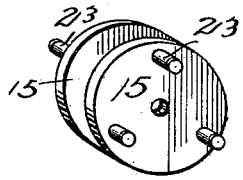
Fig. 5.
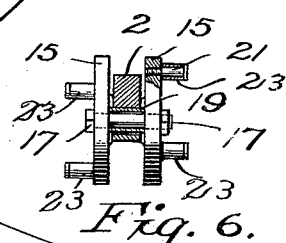
Fig. 6.
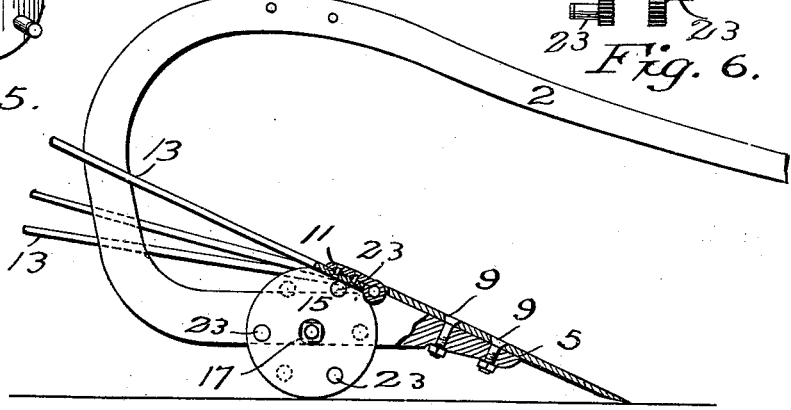
Fig. 3.
Witnesses:
O. E. Van Dorn.
M. E. Gooley.
Inventor:
Adolph G. Lano.
By Paul & Hawley
his Attorneys.

UNITED STATES PATENT OFFICE.

ADOLPH G. LANO, OF SOUTH HAVEN, MINNESOTA.

POTATO-DIGGER.

SPECIFICATION forming part of Letters Patent No. 595,396, dated December 14, 1897.

Application filed August 31, 1896. Serial No. 604,354. (No model.)

*To all whom it may concern:*

Be it known that I, ADOLPH G. LANO, of South Haven, in the county of Wright, State of Minnesota, have invented certain new and useful Improvements in Potato-Diggers, of which the following is a specification.

This invention consists in a simple device, substantially in the form of a plow, which may be used for running along a row of potatoes and plowing out all the potatoes and shaking them free from the dirt and leaving them on top of the ground; and the invention consists generally in a plow provided with hinged plates, each having a series of fingers, over which the potatoes pass and through which the dirt drops, with means for giving to said fingers a vibratory movement for the purpose of shaking the dirt from the fingers while the potatoes pass over the ends of the fingers and drop upon the top of the ground.

The invention consists, further, in the constructions and combinations hereinafter described, and particularly pointed out in the claim.

In the accompanying drawings, forming part of this specification, Figure 1 is a perspective view of a potato-digger embodying my invention. Fig. 2 is a plan view thereof, the handles being omitted. Fig. 3 is a side elevation and partial section of the same with the handles omitted. Fig. 4 is a rear end elevation of the shovel or plow and fingers, showing the elevation of the outside fingers. Figs. 5, 6, and 7 are details of the wheels by which vibratory motion is imparted to the fingers.

In the drawings, 2 represents an ordinary plow-beam of suitable form and construction and provided with suitable handles 3, by which it may be guided. To the lower end of this plow-beam is secured the shovel 5, consisting, preferably, of a flat plate of nearly triangular form and arranged in an inclined position, with its point centrally arranged beneath the beam 2. This plate is preferably secured to the beam by means of suitable bolts 9. To the rear edge of said plate, at the opposite sides of the beam, are hinged plates 11, and to these plates are secured, preferably by rivets, the series of fingers 13, which may be of any suitable length, the outside finger upon each plate being preferably slightly elevated above the others, as shown in Fig. 4. A wheel 15 is arranged at each side of the plow-beam beneath the fingers 13. These wheels are preferably secured upon the bolts 17, that pass through the sleeve 19, arranged in an opening of the beam. (See Fig. 6.) Each of the wheels 15 has secured to it a series of pins 21, having, preferably, the freely-rotating sleeve 23 arranged thereon. (See Fig. 6.) As the wheels rotate these pins strike the under surface of one of the fingers or the under surface of the plate 11, and thereby said plate and fingers are given a vibratory movement. The pins on the two wheels are preferably arranged so as to alternate with each other, (see Figs. 3 and 6,) and by this means the two plates and fingers are given a constant vibratory movement so long as the plow is in motion. The wheels may be of any desired diameter or width, and any desired number of pins may be used thereon. The sleeves 23 upon said pins distribute the wear and act also as antifriction-bearings for the fingers. The details of the construction may be varied without departing from my invention, and the shovel and the vibratory plates and fingers may be of any preferred form or size. In place of using a single sleeve 23 upon the pins 21 I may prefer to use a series of washers 23', constituting said sleeve, as shown in Fig. 7.

I claim as my invention and desire to secure by Letters Patent—

The combination, with the beam 2 of the inclined pointed plate 5 secured to said beam by the bolts 9, the wheels 15 mounted upon said beam, in the rear of the plate 5, and provided with pins 21 and having the sleeves 23, the plates 11 hinged to the rear edge of the shovel 5 and provided with a series of fingers 13, said plates being adapted to be vibrated by said wheels and pins, the outer fingers 13 being raised above the other fingers, all substantially as described.

In testimony whereof I have hereunto set my hand this 17th day of August, A. D. 1896.

ADOLPH G. LANO.

In presence of—
CLARENCE J. PAUL,
C. J. BARTLESON.